United States Patent [19]

Abel

[11] 4,319,809
[45] Mar. 16, 1982

[54] SYMMETRICAL 1:1 PHOTOGRAPHIC OBJECTIVE LENS

[75] Inventor: Irving R. Abel, Lexington, Mass.

[73] Assignee: The United States of America as represented by the Secretary of the Air Force, Washington, D.C.

[21] Appl. No.: 140,529

[22] Filed: Apr. 15, 1980

[51] Int. Cl.³ .............................................. G02B 9/62
[52] U.S. Cl. .................................................... 350/464
[58] Field of Search ........................................ 350/464

[56] References Cited

U.S. PATENT DOCUMENTS

| 2,734,424 | 2/1956 | Bertele | 350/464 |
| 3,700,312 | 10/1972 | Bertele | 350/464 |
| 3,865,471 | 2/1975 | McCrobie | 350/464 |
| 3,871,749 | 3/1975 | Harada | 350/464 |
| 4,013,349 | 3/1977 | Bertele et al. | 350/464 X |

Primary Examiner—John K. Corbin
Assistant Examiner—Scott J. Sugarman
Attorney, Agent, or Firm—Donald J. Singer; Arsen Tashjian

[57] ABSTRACT

An objective lens system of the Double Gauss type wherein negative lens elements are symmetrically disposed on both sides adjacent the stop, each negative element being a cemented doublet comprising a double convex negative and a positive lens element. A cemented doublet positive lens component is next positioned at the outside of each of the negative elements and a single positive lens is positioned at the outside of each of the inner positive lens components.

1 Claim, 1 Drawing Figure

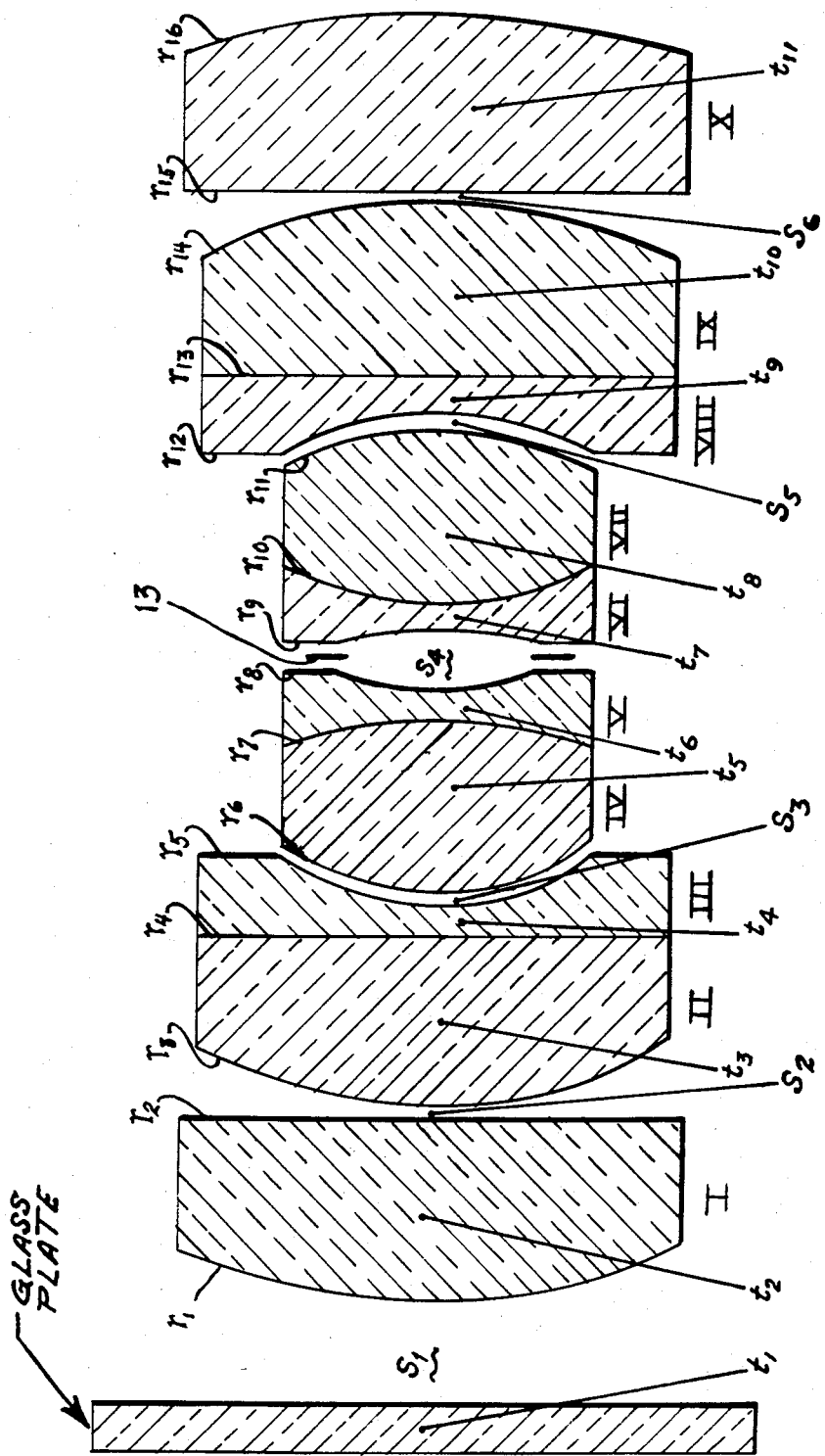

SYMMETRICAL 1:1 PHOTOGRAPHIC OBJECTIVE LENS

STATEMENT OF GOVERNMENT INTEREST

The invention described herein may be manufactured and used by or for the Government for governmental purposes without the payment of any royalty thereon.

BACKGROUND OF THE INVENTION

This invention relates to a photographic objective lens system and more particularly the invention is concerned with providing a symmetrical arrangement of optical elements suitable for transferring the image on a cathode ray tube face plate to a photographic film at 1:1 magnification with a high level of chromatic correction in the highly dispersive spectral region from 0.40 to 0.52 microns wavelength.

The design of the thick meniscus anastigmats is a complex undertaking because of the close inter-relationship of all the variables. In general, the exterior shape and thickness are chosen to control the Petzval sum, and the distance from the stop can be used to adjust the astigmatism. However, the adjustment of element powers to correct chromatic aberration inevitably upsets the balance, as does the bending of the entire meniscus to correct spherical. What is necessary is one simultaneous solution for the relative powers, thicknesses, bendings and spacings. The efforts of designers in this direction over many years have produced many good representative designs which can be improved by utilizing the newer types of optical glass such as the rare earth glasses. The introduction of new types of glasses containing rare earths has led to lens elements which for the same power have weaker surfaces and are, therefore, capable of achieving more favorable conditions.

It would be especially desirable and a step forward in the art to provide a photographic objective lens which is particularly suitable for transferring the image on a cathode ray tube face to a photographic film at a 1:1 magnification. A lens suitable for this purpose must provide a high level of optical imaging quality over the entire format of the tube face. In order to accomplish this, particular glass types, number of elements and the use of thicknesses greater than usual are required to produce the high quality image of the phospor tube. Also, the particular glass types should permit a high level of chromatic correction in the highly dispersive spectral region from 0.40 to 0.52 microns wavelength.

SUMMARY OF THE INVENTION

The present invention provides a photographic objective lens system of the Double Gauss or Biotar type which is especially suitable for the 1:1 magnification transfer of the image on a cathode ray tube face to a photographic film. The particular glass types, the number of elements and the use of thicknesses greater than usual produces a lens which provides an unusually high level of optical imaging over the entire format of a P-11 phosphor. Certain of the elements are composed of a particular glass type which makes possible the high level of chromatic correction required.

Accordingly, it is an object of the invention to provide an improved photographic objective lens suitable for 1:1 magnification transfer of the image on a cathode ray tube face to a photographic film.

Another object of the invention is to provide an objective lens system comprised of 10 lenses symmetrically arranged such that 5 are positioned on either side of the stop. Negative lens elements in the form of cemented doublets are positioned adjacent the stop and two positive lens elements are placed outside each of the negative doublets. The central positive lens elements are also in the form of cemented doublets.

Still another object of the invention is to provide a photographic objective lens having a high level of optical imaging quality over the entire format of the cathode ray tube and having a high level of chromatic correction in the highly dispersive spectral region covered.

A further object of the invention is to provide a lens system using thicknesses greater than usual to produce a uniformly high image quality over the field of view.

A still further object of the invention is to provide a lens system using particular glass types in order to obtain a high level of chromatic correction.

These and other objects, features and advantages will become more apparent after considering the following description taken in conjunction with the annexed drawing and appended claim.

DESCRIPTION OF THE DRAWING

The FIGURE is a cross-sectional view of the lens system according to the invention.

DESCRIPTION OF A PREFERRED EMBODIMENT

Symbols in the field in which this invention occurs are well established and Roman Numerals I, II, etc. beginning with oncoming light indicate lens elements. Lens surface radii of curvature are indicated by the letter r. Lens radii of curvature are positive for lens surfaces which are convex to oncoming light and negative for lens surfaces which are concave to oncoming light. The letter t indicates the axial thickness of the lenses and the letter S indicates the axial air spaces between the lens element surfaces. $N_D$ is the refractive index for the sodium light D line of the spectrum of lambda 5893 Å. $V_d$ is the reciprocal dispersive power of Abbe number. The lens system described herein may be constructed from commercially available glass types.

Referring now to the drawing, the photographic objective according to the invention will be seen to include ten elements I through X, the elements being arranged in two groups of five symmetrically, one group on each side of the stop 13. One group of elements includes lenses I through V and the other group includes lenses VI through X. In each group the element nearest the stop 13, i.e., the elements V and VI, is a double-concave lens. The elements IV and VII are double-convex and are cemented to the surfaces farthest from the stop of the elements V and VI to form a negative meniscus inner doublet. Elements II and III and VIII and IX are cemented doublets positioned with their concave side toward the stop 13 and are the central positive elements of each group. The outermost elements I and X are positive converging lenses thereby completing the lens system according to the invention.

A practical example of a symmetrical 1:1 photographic objective lens according to the invention is set forth herewith, with one embodiment being illustrated in FIG. 1 and constructed according to the data contained in the following table wherein the symbols used are defined at the beginning of this section.

TABLE I

| Element | Radii | Thickness and Separation | f/2.5 $N_d$ | $V_d$ |
|---|---|---|---|---|
| | f = 100 | | | |
| Glass Plate | plano | $t_1 = .30$ | 1.51680 | 64.17 |
| | plano | $S_1 = 9.740$ | | |
| I | $r_1 = 5.6335$ | $t_2 = 1.195$ | 1.65160 | 58.52 |
| | $r_2 = -42.35$ | $S_2 = .05$ | | |
| II | $r_3 = 3.4850$ | $t_3 = 1.175$ | 1.65160 | 58.52 |
| III | $r_4 = 22.772$ | $t_4 = .25$ | 1.61340 | 44.30 |
| | $r_5 = 2.0797$ | $S_3 = .12$ | | |
| IV | $r_6 = 3.1449$ | $t_5 = 1.057$ | 1.62041 | 60.33 |
| | $r_7 = -3.3260$ | $t_6 = .25$ | 1.61340 | 44.30 |
| STOP | $r_8 = 3.0877$ | $S_4 = .189$ | | |
| VI | $r_9 = -3.0877$ | $t_7 = .25$ | 1.61340 | 44.30 |
| VII | $r_{10} = 3.3260$ | $t_8 = 1.057$ | 1.62041 | 60.33 |
| | $r_{11} = -3.1449$ | $S_5 = .12$ | | |
| VIII | $r_{12} = -2.0797$ | $t_9 = .25$ | 1.61340 | 44.30 |
| IX | $r_{13} = -22.772$ | $t_{10} = 1.175$ | 1.65160 | 58.52 |
| | $r_{14} = -3.480$ | $S_6 = .05$ | | |
| X | $r_{15} = 42.35$ | $t_{11} = 1.195$ | 1.65160 | 58.52 |
| | $r_{16} = -5.6335$ | | | |

Although the invention has been illustrated in the accompanying drawing and described in the foregoing specification in terms of a preferred embodiment thereof, the invention is not limited to this embodiment or to the particular configuration shown. It will be apparent to those skilled in the art that certain changes, modifications and substitutions can be made in order to adapt the lens system to different usages and conditions without departing from the true spirit and scope of the appended claims.

Having thus set forth the nature of my invention, what I claim and desire to secure by Letters Patent of the United States is:

1. A photographic objective lens constructed substantially in accordance with the following data:

| Element | Radii | Thickness and Separation | f/2.5 $N_d$ | $V_d$ |
|---|---|---|---|---|
| | f = 100 | | | |
| Glass Plate | plano | $t_1 = .30$ | 1.51680 | 64.17 |
| | plano | $S_1 = 9.740$ | | |
| I | $r_1 = 5.6335$ | $t_2 = 1.195$ | 1.65160 | 58.52 |
| | $r_2 = -42.35$ | $S_2 = .05$ | | |
| II | $r_3 = 3.4850$ | $t_3 = 1.175$ | 1.65160 | 58.52 |
| III | $r_4 = 22.772$ | $t_4 = .25$ | 1.61340 | 44.30 |
| | $r_5 = 2.0797$ | $S_3 = .12$ | | |
| IV | $r_6 = 3.1449$ | $t_5 = 1.057$ | 1.62041 | 60.33 |
| | $r_7 = -3.3260$ | $t_6 = .25$ | 1.61340 | 44.30 |
| STOP | $r_8 = 3.0877$ | $S_4 = .189$ | | |
| VI | $r_9 = -3.0877$ | $t_7 = .25$ | 1.61340 | 44.30 |
| VII | $r_{10} = 3.3260$ | $t_8 = 1.057$ | 1.62041 | 60.33 |
| | $r_{11} = -3.1449$ | $S_5 = .12$ | | |
| VIII | $r_{12} = -2.0797$ | $t_9 = .25$ | 1.61340 | 44.30 |
| IX | $r_{13} = -22.772$ | $t_{10} = 1.175$ | 1.65160 | 58.52 |
| | $r_{14} = -3.480$ | $S_6 = .05$ | | |
| X | $r_{15} = 42.35$ | $t_{11} = 1.195$ | 1.65160 | 58.52 |
| | $r_{16} = -5.6335$ | | | | wherein $r_1, r_2 \ldots$ represent the radii of the individual surfaces of the elements, $t_1, t_2 \ldots$ represent the thickness of the elements, $S_1, S_2 \ldots$ represent the axial separation between the elements, $N_d$ is the index of refraction for the sodium D line and $V_d$ is the Abbe number.

* * * * *